E. V. OLANDER.
EGG BEATER AND MIXING SPOON.
APPLICATION FILED MAR. 26, 1917.
1,272,506.
Patented July 16, 1918.
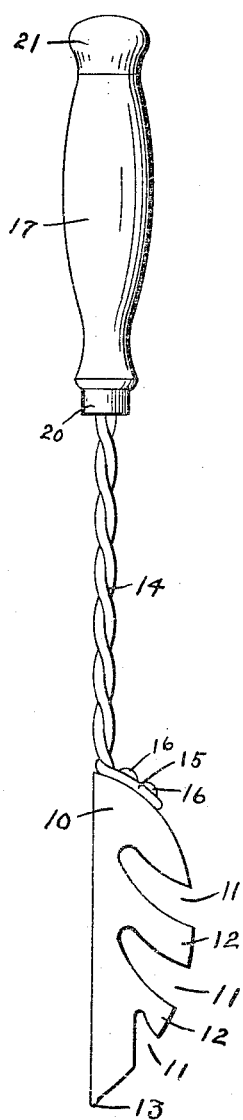
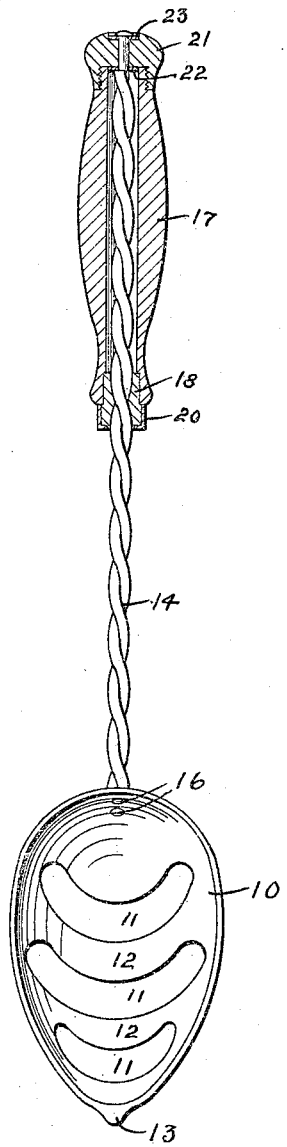
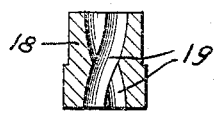
Inventor
Ernest V. Olander

UNITED STATES PATENT OFFICE.

ERNEST V. OLANDER, OF GRAND RAPIDS, MICHIGAN.

EGG-BEATER AND MIXING-SPOON.

1,272,506.     Specification of Letters Patent.     Patented July 16, 1918.

Application filed March 26, 1917. Serial No. 157,436.

*To all whom it may concern:*

Be it known that I, ERNEST V. OLANDER, a citizen of the United States, and a resident of Grand Rapids, in the county of Kent and State of Michigan, have invented a certain new and useful Improvement in Egg-Beaters and Mixing-Spoons, of which the following is a specification.

The present invention relates to kitchen utensils, and has for an object to provide a unitary device in the form of a spoon which may be used for beating eggs, and also for mixing batter, dough and the like.

Another object of the present invention is to provide a mixing spoon with a handle which may be adjusted to be rigidly connected to the bowl of the spoon for handling the same in the ordinary manner, and which is provided with perforations in the bowl portion to allow the passage of batter, dough and the like therethrough during the mixing operation, and which is provided with means for releasing the handle and so connecting the same to the bowl that upon reciprocation of the handle the bowl may be rotated for mixing and beating purposes.

The above, and various other objects and advantages of this invention will be in part described, and in part understood, from the following detailed description of the present preferred embodiment, the same being illustrated in the accompanying drawing wherein:

Figure 1 is a side elevation of a spoon constructed according to the present invention.

Fig. 2 is a plan view of the spoon, the handle portion or grip thereof being shown in section.

Fig. 3 is a vertical median section of the guiding plug member.

Referring to this drawing, 10 designates the bowl or blade of the spoon which is of substantially the same general contour of spoons now generally used, and which is provided in the body portion thereof with a plurality of transversely extending arcuate slots or openings 11. The bowl thus formed provides a blade with a marginal annular frame having a plurality of transverse curved and arched bars 12 serving as paddles or beaters.

The bowl 10 is also provided at its outer end with a projection or tip 13 upon which the bowl may rest when the latter is turned axially for use as a rotary beater.

The bowl 10 is supported upon a shank 14 formed preferably from relatively heavy wire, two strands being employed which are twisted about each other to provide a pair of spirally-formed grooves extending lengthwise of the shank 14. Preferably the shank is formed of a single length of wire returned upon itself and having its looped end 15 curved to the configuration of the inner end of the bowl 10 and lying flat thereagainst. The loop 15 may be secured to the exterior of the bowl 10 by rivets 16 or the like, and the shank 14 is supported in axial alinement with the tip or projection 13.

A hand-grip 17, in the form of an elongated sleeve, is freely slidable upon the shank 14, the handle being provided with a relatively large opening extending longitudinally therethrough. The handle 17 may be given any suitable exterior configuration to adapt it for ready grasping in the hand of the operator. A guiding plug 18 is rigidly mounted in the lower end of the handle 17, or in the end adjacent to the bowl 10, and is provided longitudinally therethrough with guiding grooves 19 of spiral form adapted to receive therethrough the twisted strands of the shank 14. The guiding plug 18 is reinforced by the provision of a ferrule 20 which surrounds the lower end thereof to hold the plug 18 from splitting when subjected to internal pressure by the reciprocation of the plug 18 over the shank 14.

A cap 21 is detachably interlocked with the upper end of the handle 17, as by screw threads as shown, and one end of the length of wire from which the shank 14 is formed extends outwardly through the cap 21 and is rotatable therein. A washer 22 is preferably interposed between the inner side of the cap 21 and the adjacent free extremity of said length of wire, and a second washer 23 is preferably counter-sunk in the outer face of the cap 21 about the extension or swiveled end of the shank. The said extension of the shank is preferably headed at its extremity against the outer face of the washer 23 to hold the cap 21 to the shank.

In operation, when the spoon is adjusted in the position shown in Figs. 1 and 2, the handle 17 may be grasped in the hand and the spoon used in the ordinary manner of beating. When in such use the shank 14 is held from rotation in the handle 17 by the interlocked cap 21 which prevents the longitudinal movement of the shank through the guiding plug 18, and thus holds the bowl 10 from turning upon the handle. As the bowl 10 is moved through the batter or dough, the latter passes through the slots 11 and is thoroughly broken up.

When it is desired to rotate the bowl 10 for the purpose of mixing or beating, it is only necessary to detach the cap 21 from the upper end of the handle 17, such as by unscrewing the cap 21 therefrom, and holding the cap 21 in one hand and reciprocating the handle 17 by the other hand. The tip 13 of the bowl 10 rests upon the bottom of the receptacle into which the bowl 10 may be inserted, and the movement of the handle 17 carries the guiding plug 18 over the shank 14, the strands of the shank passing spirally through the plug 18 and thus rotating the shank 14 and the bowl 10.

The action of the bowl 10 is a reciprocatory one as the handle 17 is moved up and down on the shank 14. It will be thus noted that the eggs or the like which are subjected to the beating or mixing action are thoroughly agitated, and the substances are free to pass through the slots 11, and are thoroughly broken up by the cross-bars 12 formed in the spoon body.

It is of course understood that various changes and modifications may be made in the details of construction and design of the above-specifically described spoon without departing from the spirit of this invention, and being restricted only by the scope of the following claims.

I claim:—

1. In an implement as specified, the combination with an article adapted at times to be rotated and at times to be held from turning, of a shank secured at one end axially to the article, and having an exterior spiral rib, a cap swiveled to the free end of the shank for receiving the hand to hold the shank for turning, a handle mounted on the shank and fitting the spiral rib for turning the shank and article by the longitudinal movement, and means for locking the handle to the cap for holding the handle from movement upon and about the shank whereby the article may be supported from turning by the handle.

2. In an implement as specified, the combination with an article adapted to be at times rotated and at other times held from turning, of a shank secured at one end axially to the article, and having an exterior spiral rib, a cap swiveled to the free end of the shank for receiving the hand to hold the shank for turning and provided with a threaded counter-bore and a handle mounted on the shank and fitting the spiral rib for turning the shank and article when the handle is moved longitudinally, said handle having an exteriorly threaded upper end adapted to engage in said counter-bore of the cap for locking the handle to the cap and maintaining the handle from movement upon and about the shank whereby the article may be supported from turning by the handle.

ERNEST V. OLANDER.

Copies of this patent may be obtained for five cents each, by addressing the "Commissioner of Patents, Washington, D. C."